United States Patent [19]

Hirosawa et al.

[11] Patent Number: 4,748,558
[45] Date of Patent: May 31, 1988

[54] LOAD BALANCING CONTROL METHOD FOR A LOOSELY COUPLED MULTI-PROCESSOR SYSTEM AND A DEVICE FOR REALIZING SAME

[75] Inventors: Toshio Hirosawa, Machida; Kazumitu Kondo; Katsuto Miyazaki, both of Hachioji; Kenji Fujikata, Tokyo, all of Japan

[73] Assignee: Hitachi, Ltd., Tokyo, Japan

[21] Appl. No.: 858,791

[22] Filed: May 1, 1986

[30] Foreign Application Priority Data

May 2, 1985 [JP] Japan .................................. 60-93617

[51] Int. Cl.⁴ ............................................. G06F 15/16
[52] U.S. Cl. .................................................. 364/200
[58] Field of Search ......................... 364/200 MS File

[56] References Cited

U.S. PATENT DOCUMENTS 4,403,286 9/1983 Fry et al. ............................ 364/200

Primary Examiner—Raulfe B. Zache
Attorney, Agent, or Firm—Antonelli, Terry & Wands

[57] ABSTRACT

A loosely coupled multi-processor system including a plurality of terminals and corresponding processors. When a particular terminal tries to start a program, the corresponding processor sets the largest number of the terminals, which are serviceable, on the basis of the load status of the processors which are permanently watched by the OS (operating system) in a main memory. The processor compares this largest number with the number of terminals, which are in service at that time and when the number of the terminals, which are in service, is smaller than the largest number, processing by the terminal issuing a service demand begins. Alternatively, when the number of the terminals, which are in service, is equal to or greater than the largest number, the processor cannot treat the service demand from the terminal and reports this to a global processor. The global processor examines the load status indicator contained therein which shows the load status of each of the system processors; selects the processor having the lightest load status; and issues an order to treat the service demand from the requesting terminal to the selected processor having the lightest load. The processor, which has received the order, performs the processing of the service demand from the requesting terminal, based on the instruction from the global processor.

12 Claims, 2 Drawing Sheets

F I G. 2
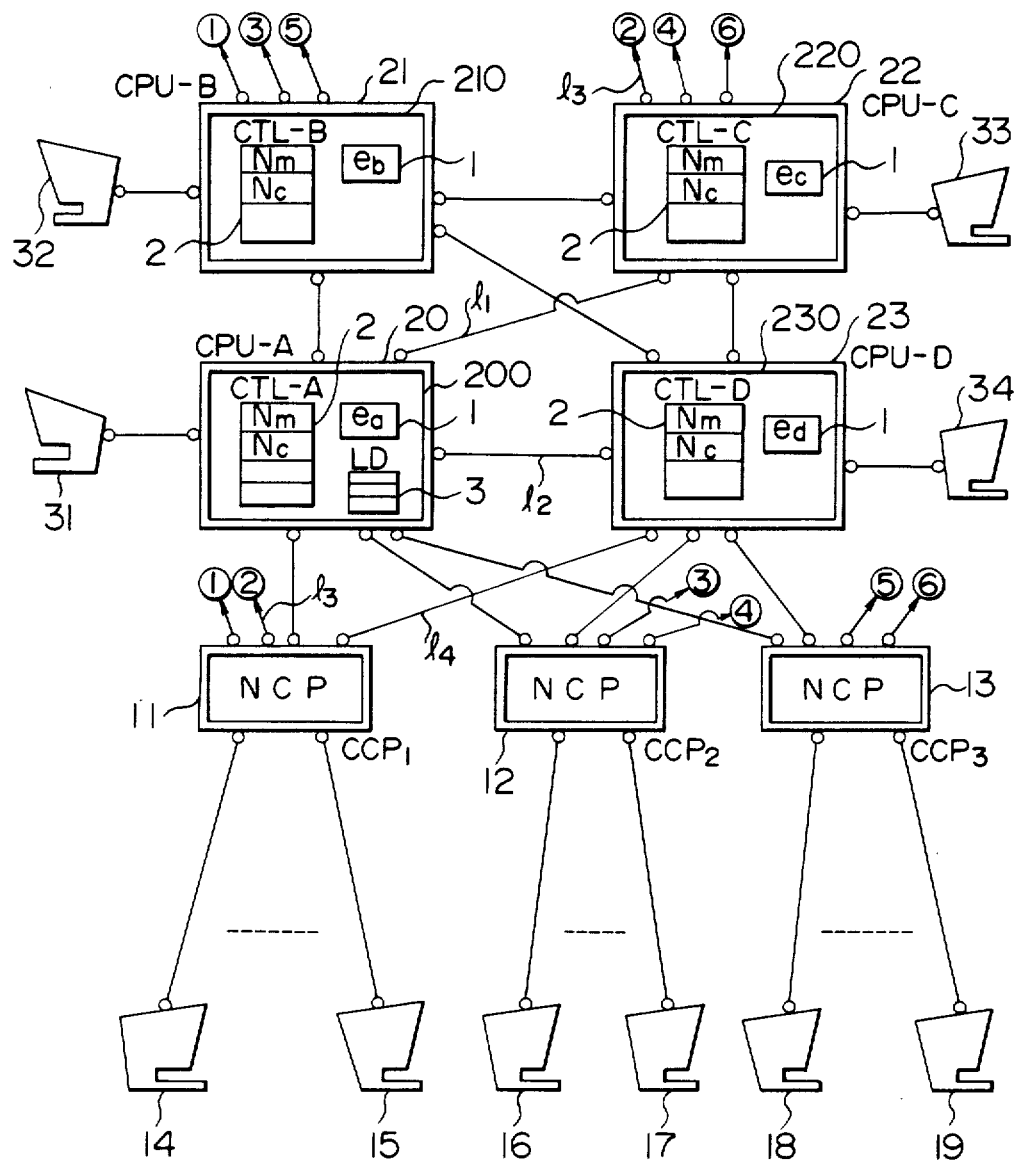

LOAD BALANCING CONTROL METHOD FOR A LOOSELY COUPLED MULTI-PROCESSOR SYSTEM AND A DEVICE FOR REALIZING SAME

BACKGROUND OF THE INVENTION

This invention relates to a multi-processor system provided with a plurality of processors and in particular to a load balancing control method and a device for realizing the same, which are suitable to balance loads applied to the plurality of processors as uniformly as possible, when the processors are so constructed that they are loosely coupled with each other.

Various methods for ameliorating processing characteristics of an electronic computer system by combining a plurality of processors have been proposed and brought into practice. The following are representative examples of such system constructions:

(1) a tightly coupled multi-processor system, whose processors have a main memory in common, and (2) a loosely coupled multi-processor system constructed by processors, each of which is provided with a main memory exclusively used, are generally known.

In the two representative multi-process system constructions described above, the tightly coupled multi-processor system indicated in (1) is efficacious for ameliorating processing characteristics for the real time processing (known as the on-line real time processing). On the other hand the loosely coupled multi-processor system indicated in (2) is efficacious for increasing batch processing characteristics, i.e. increasing the throughput. Recently, the loosely coupled multi-processor system indicated in (2) is utilized more and more widely from the viewpoint of increasing reliability of the electronic computer system. This may be due to the fact that, in the case of the loosely coupled multi-processor system, even if trouble is produced in either one of the processors constituting the multi-processor system and the processor is stopped, service of the whole electronic computer system is not stopped, if it is so controlled that the processor carries out no work (job).

On the other hand, with the recent remarkable development of utilization of electronic computer systems, needs for on-line processing such as TSS (Time Sharing System) apart from batch processing increase. Consequently, it is desired to ameliorate characteristics of on-line processing represented by TSS processing under a loosely coupled multi-processor system construction aiming at increasing batch processing characteristics.

This leads to realizing a control method permitting to balance loads applied to processors in a multi-processor structure as uniformly as possible.

One of the prior art techniques for the load balancing control method for a multi-processor system in the on-line processing such as TSS processing is disclosed in Japanese Patent Unexamined Publication No. 59-157778. The load balancing control method disclosed in that publication will be explained below briefly, referring to FIG. 1. According to the load balancing control method disclosed in FIG. 2, in a structure provided with processors $CP_0$, $CP_1$ and a memory CM common to the processors, in which each of communication control processors $SP_0$—$SP_n$ is connected to each of the processors $CP_0$, $CP_1$ and terminals A, B and so forth are connected to each of the communication control processors $SP_0$—$SP_n$, the load status of each of the processor is stored as $e_0$, $e_1$ in the common memory CM; and finally the number $n_1$ of the last load processor is stored therein. A server's memory $SM_0$, $SM_1$ is disposed in each of the communication control processors $SP_0$—$SP_n$ and in $SM_0$ are set the called status processor number $n_a$ corresponding to the terminal A and the called status processor number $n_b$ corresponding to the terminal B.

In this construction, by setting permanently the number of the processor, which is the least frequently used, at $n_1$, when data has been once transferred from the terminal A to the terminal B, the communication control processor $SP_0$ searches the called status processor number $n_a$ (supposed to be 0 here) corresponding to the terminal A from the server's memory $SM_0$ and demands a connection process to the processor $CP_0$. The processor $CP_0$, which has received the demand, sets a call between the terminal A and the terminal B through the processor $SP_0$ and changes the called status processor number in the processor $SP_0$ to $n_b=0$. When the data transfer between the terminals A and B is terminated, the processor $SP_0$ searches $n_a=0$ and $n_b=0$ corresponding to the terminals A and B, respectively, from the memory $SM_0$ and demands a disconnecting process to the processor $CP_0$.

Now, supposing that $n_1=0$ has been set, the processor $CP_0$ disconnects the call, which has been set between the terminals A and B; at the same time searches the last load processor number $n_1=0$ in the common memory CM and set the called status processor numbers $n_a$ and $n_b$ in the server's memory $SM_0$ equal to the last load processor number $n_1=0$. In this way, when the terminal B is called at the next time, the processor $SP_0$ demands a connecting process to the processor $CP_0$, which is lightly loaded.

The load balancing control method is thus realized. However the method disclosed in the abovementioned Japanese Patent Unexamined Publication No. 59-157778 is realizable only in a tightly coupled multi-processor system construction and no control method realizable in a loosely coupled multi-processor system is disclosed therein. Further the control method disclosed in the above-mentioned publication can be realized by the fact that the system is provided with a memory common to processors.

SUMMARY OF THE INVENTION

The object of this invention is to provide a method for balancing loads applied to a plurality of processors in a loosely coupled multi-processor system construction as uniformly as possible and a device for the same, and in particular to provide a method for balancing properly loads to a plurality of processors at the on-line processing represented by the TSS processing and a device for the same.

The load balancing control method according to this invention for the loosely coupled multi-processor system utilizes an indicator indicating the load status of each of the processors in its own memory and a means for memorizing the upper limit of the number of terminals, which can be connected with the processor, and the number of terminals, which are actually connected. In addition, the loosely coupled multi-processor system comprises a means for storing the load status of all the processors constituting the loosely coupled multi-processor system in its global processor.

On the basis of these constituent elements, each of the processors in the loosely coupled multi-processor system tries at first to start a program coming from a terminal connected therewith. At this time the relevant processor sets the largest number of the terminals, which are serviceable, on the basis of the load status of the processors permanently watched by the OS (operating system) in the main memory. Next this largest number is compared with the number of the terminals, which are in service at that time. When the number of the terminals, which are in service, is smaller than the largest number, after having increased the number of terminals by 1, the processor proceeds to the processing, whose program start is demanded by the relevant terminal. Thus the processor has treated the service demand from the relevant terminal. In addition, when the processing, whose program start is demanded by the relevant terminal, is terminated, after having decreased the number of the terminals, which were in service, by 1, the relevant terminal is disconnected.

To the contrary, when the number of the terminals, which are in service, is equal to or greater than the largest number, the processor cannot treat the service demand from the terminal and therefore reports it to the global processor. The global processor examines the load status indicator of each of the processors memorized in its own processor; selects the processor having the lightest load status; and issues an order to treat the service demand from the relevant terminal to the selected processor. The processor, which has received the order, performs the processing of the service demand from the terminal, based on the order of the global processor. In this way, load is uniformly balanced in the loosely coupled multi-processor system.

BRIEF DESCRIPTION OF THE DRAWING

FIG. 2 is a scheme for explaining the load balancing control method in a loosely coupled multi-processor system according to this invention.

DESCRIPTION OF THE PREFERRED EMBODIMENTS

Figure 1:
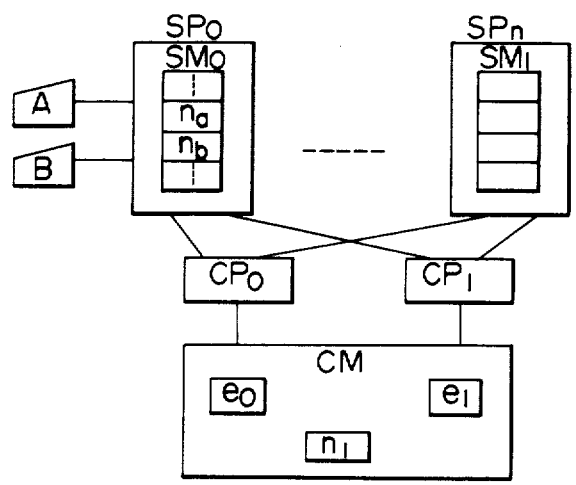
FIG. 1 is a scheme for explaining the load balancing control method in a prior art tightly coupled multi-processor system.

Hereinbelow an embodiment of this invention will be explained, referring to the drawing. FIG. 2 is a scheme for explaining the load balancing control method in a loosely coupled multi-processor system according to the embodiment of this invention. In FIG. 2, reference numerals 20-23 indicate a group central processors constituting the loosely coupled multi-processor system, which are denoted by CPU-A, CPU-B, CPU-C and CPU-D, respectively. A reference numeral 200 represents the main memory exclusively used for the central processor CPU-A. The main memory 200 can store programs and data. In this embodiment of this invention, each of the central processors comprises a load status indicator 1 described in the summary of the invention, a control block 2 concerning terminal information, which is a region memorizing the number of terminals, etc. Analogously to the main memory 200, a reference numeral 210 represents the main memory of the central processor CPU-B21, 220 represents the main memory of the central processor CPU-C22, and 230 represents the main memory of the central processor CPU-D23.

In the embodiment indicated in FIG. 2, it is assumed for purposes of example that the central processor CPU-A20 is the global processor of the loosely coupled multi-processor system. The global processor CPU-A20 includes a control block memorizing the load of each of the processors within the central loosely coupled multi-processor system. This control block is denoted by a reference numeral 3 and indicated as an LD (load) block.

The reference numeral 1 is the indicator indicating the load status of the processor. As an index for the load status of the processor, either one of the utilization rate of CPU, the number of central processor input/output operations per unit time and the utilization rate of the main memory or a mixed value of them can be used as well. Any one can be used, if it can express in the result the load status of the processor.

The reference numeral 2 indicates the control block concerning terminal information treated by the processor, and the maximum number of terminals related to the processor $N_m$, the number of terminals $N_c$, which are in service at that time, and so forth are stored therein.

The reference numeral 3 indicates the control block memorizing the load of all the processors within the loosely coupled multi-processor system, in which the first entry represents the load status of its own processor (global processor) and the second and the other entries represent the load status of the other processors (local processors) within the loosely coupled multi-processor system. The LD block 3 exists only in the global processor.

The reference numerals 1 and 2 appearing also in the main memory 210 in the processor CPU-B, the main memory 220 in the processor CPU-C and the main memory 230 in the processor CPU-D have the same meanings as the indicator 1 and the control block 2, respectively, existing in the main memory 200.

Reference numerals 11 to 13 indicate a communication control processors (CCP$_1$-CCP$_3$)11-13, in each of which a network control program (NCP) corresponding to the operating system (OS) therefor is performed.

Reference numerals 14-19 indicate terminals connected to the communication control processors (CCP$_1$-CCP$_3$)11-13 and 31-34 indicate terminals connected directly to each of the central processors (CPU-A-CPU-D).

Each of the communication control processors 11-13 is connected to all the central processors (CPU-A-CPU-D). Further all the processors CPU-A-CPU-D are connected to each other.

Now the load balancing operation between the processors will be explained. Here, as an example, the operation for a service demand from a terminal 32 connected to the processor CPU-C is explained.

When the processor CPU-C receives a program start demand from the terminal 33, it sets the value $N_m$ in the CTL-C control block 2 within the main memory 220 on the basis of the value set in the load status indicator 1 of the central processor CPU-C permanently watched. At this time it reports a value $e_c$ to the global processor CPU-A through a line $l_1$ and the processor CPU-A updates the value of the relevant entry in the LD control block 3. The set of the value from $e_c$ to $N_m$ is effected by a proportion calculation. Then, $N_m$ and $N_c$ are compared with each other. When $N_c$ is smaller than $N_m$, this means that the central processor CPU-C can treat the service demand from the terminal 33. After having increased $N_c$ by 1, the processor CPU-C starts the relevant program. In addition, when the relevant processing program has been carried out, the terminal is logically disconnected and $N_c$ is decreased by 1.

To the contrary, when $N_c$ is equal to or greater than $N_m$, this means that the central processor CPU-C cannot treat the service demand and the central processor CPU-C reports it to the global processor CPU-A through the line $l_1$.

When the global processor CPU-A receives the report from the central processor CPU-C, it searches the entries in the LD control block 3 and selects the processor having the smallest entry. At this time, if the selected processor is the same processor which has issued the report, this means that the multi-processor system is overloaded, and therefore the global processor informs such to the processor CPU-C again through the line $l_1$. Consequently the service demand from the terminal 33 is not treated.

Suppose now that the central processor CPU-D is selected on the basis of the result of the search of the LD control block. The global processor CPU-A reports to each of the central processors (CPU-C,CPU-D) through the lines $l_1$ and $l_2$ that it has selected the central processor CPU-D. At this time it indicates also a logical connection path to the terminal 33. The indication is e.g. that the connection should pass through the lines $l_3$ and $l_4$. Based on this indication, the central processor CPU-C can transmit the service demand from the terminal 33 via the communication control processor CCP 11 through the line $l_3$ and further through the line $l_4$ to the central processor CPU-D, after having received it. The the central processor CPU-D performs the processing program responding to the service demand from the terminal 33. Further the central processor CPU-D, which has received the order from the central processor CPU-A, compares $N_m$ with $N_c$ in the same way as described above. Consequently, in the case where a state inwhich it is impossible to treat the service demand from the terminal 33 is brought into existence, the central processor CPU-D reports it again to the central processor CPU-A through the line $l_2$.

Then, the central processor CPU-A finds a central processor having the next lightest load status from the LD control block 3 and issues an order in the same way as described above. The global processor CPU-A is included in the group of the central processors subject to the selection. In the case where there exist no central processors which can treat the service demand from the terminal 33, the global processor CPU-A reports it to the central processor CPU-C through the line $l_1$.

The allocation of jobs to the processors for the groups of terminals 14–19 connected to the communication control processors (CCP$_1$–CCP$_3$) 11-13 is performed by the method described above.

As explained above, according to this invention, loads are balanced uniformly to a plurality of central processors of a loosely coupled multi-processor system and thus the multi-processor system can be operated with a high efficiency.

What is claimed is:

1. A load balancing method in a loosely coupled multi-processor system, in which a plurality of processors, corresponding to a plurality of terminals, each of which includes a main memory exclusively used, are coupled in a loose coupling configuration comprising the steps of:
   (a) continuously monitoring a load status of each of said plurality of processors;
   (b) storing the load status of all the processors included in said multi-processor system in a global processor;
   (c) storing a number representing the number of terminals connected to each of said processors in the main memory of each of said processors;
   (d) setting an upper limit for the number of terminals which can be connected to a processor receiving a service demand to start a program based on said load status of the processor receiving the service demand, when a terminal other than the terminals connected to said processor receiving the service demand outputs the service demand;
   (e) comparing said upper limit with said number of terminals connected to said processor receiving the service demand;
   (f) delivering information to said global processor indicating that it is impossible for said processor receiving the service demand to treat the demand from the terminal outputting said service demand to start the program, when the result of the comparing step indicates that said upper limit is less than or equal to the number of terminals connected to said processor receiving the service demand;
   (g) selecting a processor having a lightest load status based on said load status of each of the processors and outputting an instruction to the selected processor to start a processing for the terminal outputting said service demand; and
   (h) storing the the processing for said terminal receiving the service demand, when the result of the comparing step indicates that said upper limit is greater than the number of terminals connected to said processor receiving the service demand.

2. A load balancing method in a multi-processor system according to claim 1, wherein each of said plurality of processors includes a main memory exclusively used and are coupled to in a loose coupling configuration.

3. A load balancing method in a loosely coupled multi-processor system according to claim 1, wherein said system includes at least one communication processor for transmitting at least said service demand between said processors.

4. A load balancing method in a loosely coupled multi-processor system according to claim 3, wherein said system includes at least one communication processor for performing a network control program.

5. A loosely coupled multi-processor system including a plurality of processors and corresponding terminals, wherein one of said processors is a global processor for controlling said multi-processor system and each of said processor and said global processor comprises:
   (a) first memory means for continuously monitoring a load status of each of said plurality of processors and for storing said load status;
   (b) second memory means for storing an upper limit for the number of terminals which can be connected to each of said processors and a number of terminals actually connected to each of said processors;
   (c) first control means for setting an upper limit for the number of terminals which can be connected to a processor receiving a service demand to start a program based on the load status stored in said first memory means therein, when a terminal other than the terminals connected to said processor receiving the service demand outputs the service demand and for comparing said upper limit with the number of terminals connected to said processor receiving the service demand; and (d) wherein said global processor further comprises third memory means for storing the load status of each of the processors included in said multi-processor system; and (e) second control means for searching said third memory means and selecting a processor having a lightest load status.

6. A multi-processor system according to claim 5, wherein said plurality of processors are coupled in a loose coupling configuration and each of said processors includes a main memory exclusively used.

7. A load balancing method in a loosely coupled multi-processor system according to claim 5, further comprising at least one communication processor for transmitting at least said service demand between said processors.

8. A load balancing method in a loosely coupled multi-processor system according to claim 5, further comprising at least one communication processor for performing a network control program.

9. A load balancing method in a multi-processor system having a plurality of processors and corresponding terminals comprising the steps of:

(a) setting an upper limit for the number of terminals which can be connected to a processor receiving a service demand from a corresponding terminal;

(b) comparing said upper limit with said number of terminals actually connected to said processor receiving said service demand;

(c) starting a program in said processor receiving said service demand when the result of the comparing step indicates that the number of terminals actually connected to said processor receiving said service demand is smaller than said upper limit;

(d) reporting to a global processor that it is impossible for said processor receiving said service demand to start the program of the terminal outputting said service demand when the result of the comparing step indicates that the number of terminals actually connected to said processor receiving said service demand is greater than or equal to said upper limit;

(e) selecting a processor having a lightest load status based on load statuses of all the processors; and (f) outputting an instruction to the selected processor to start the program of the terminal outputting said service demand.

10. A load balancing method in a multi-processor system according to claim 9, wherein each of said plurality of processors includes a main memory exclusively used and are coupled to in a loose coupling configuration.

11. A load balancing method in a loosely coupled multi-processor system according to claim 9, wherein said system includes at least one communication processor for transmitting at least said service demand between said processors.

12. A load balancing method in a multi-processor system according to claim 11, wherein said system includes at least one communication processor for performing a network control program.

* * * * *